(12) United States Patent
Kane et al.

(10) Patent No.: US 7,243,675 B2
(45) Date of Patent: Jul. 17, 2007

(54) DROP TUBE SEGMENTS ADAPTED FOR USE WITH A LIQUID RESERVOIR

(75) Inventors: Kristopher A. Kane, Cincinnati, OH (US); James E. Kesterman, Cincinnati, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 185 days.

(21) Appl. No.: 10/837,206

(22) Filed: Apr. 30, 2004

(65) Prior Publication Data

US 2005/0241696 A1    Nov. 3, 2005

(51) Int. Cl.
*F16K 31/18*    (2006.01)

(52) U.S. Cl. .......... 137/448; 137/445; 137/15.26; 141/205; 285/404

(58) Field of Classification Search ............. 137/448, 137/434, 445, 410, 416, 15.18, 15.26; 285/404; 141/198, 59, 205, 213
See application file for complete search history.

(56) References Cited

U.S. PATENT DOCUMENTS

| | | |
|---|---|---|
| 979,819 A | 12/1910 | Anderson |
| 1,219,222 A | 3/1917 | Baxter et al. |
| 1,246,033 A | 11/1917 | Adams |
| 1,268,947 A | 6/1918 | Fell |
| 1,289,490 A | 12/1918 | Lundstrom |
| 1,313,386 A | 8/1919 | Jones |
| 1,689,066 A | 10/1928 | Baxter |
| 2,340,936 A | 2/1944 | Cook |
| 2,499,409 A | 3/1950 | Norway |
| 2,507,545 A | 5/1950 | Samiran |
| 2,685,891 A | 8/1954 | Segelhorst et al. |
| 2,811,179 A | 10/1957 | Greenwood |
| 2,839,082 A | 6/1958 | Moore et al. |

(Continued)

FOREIGN PATENT DOCUMENTS

DE    1750504 A1    8/1971

(Continued)

OTHER PUBLICATIONS

European Search Report for App. No. 05009179 dated Aug. 16, 2005.

(Continued)

*Primary Examiner*—Eric Keasel
*Assistant Examiner*—Craig Schneider
(74) *Attorney, Agent, or Firm*—Dinsmore & Shohl LLP

(57) ABSTRACT

A drop tube segment is adapted for use with a liquid reservoir. The drop tube segment includes a conduit with an end portion and a sidewall including a sidewall portion at least partially defining an interior housing area. The drop tube segment further includes a valve assembly comprising a valve member attached to the end portion of the conduit, a float, and a linkage device pivotally connected to the valve member. The valve assembly further includes a driver member at least partially disposed in the interior housing area. An adjustment of the float may rotate the driver member to engage the linkage device to facilitate in adjusting the position of the valve member with respect to the end portion of the conduit. The valve assembly further includes a structure adapted to inhibit, such as prevent, fluid from leaking into the interior housing area.

11 Claims, 9 Drawing Sheets

U.S. PATENT DOCUMENTS

| | | | |
|---|---|---|---|
| 2,918,931 A | 12/1959 | Siri | |
| 2,918,932 A | 12/1959 | Few | |
| 3,078,867 A | 2/1963 | McGillis et al. | |
| 3,610,273 A | 10/1971 | Russell | |
| 3,661,175 A | 5/1972 | Tillman | |
| 3,791,407 A | 2/1974 | Nicholls | |
| 3,794,077 A | 2/1974 | Fanshier | |
| 3,963,041 A | 6/1976 | McGillis | |
| 4,308,894 A | 1/1982 | Carpentier | |
| 4,479,669 A | 10/1984 | Hynes | |
| 4,667,711 A | 5/1987 | Draft | |
| 4,793,387 A | 12/1988 | LeBlanc et al. | |
| 4,896,705 A | 1/1990 | Podgers et al. | |
| 4,986,320 A | 1/1991 | Kesterman et al. | |
| 4,998,571 A | 3/1991 | Blue et al. | |
| 5,086,843 A | 2/1992 | Mims et al. | |
| 5,117,877 A | 6/1992 | Sharp | |
| 5,152,315 A | 10/1992 | Lagache | |
| 5,163,470 A | 11/1992 | Maeshiba | |
| 5,174,345 A | 12/1992 | Kesterman et al. | |
| 5,207,241 A | 5/1993 | Babb | |
| 5,241,983 A | 9/1993 | Lagache | |
| 5,398,735 A | 3/1995 | Lagache | |
| 5,522,415 A * | 6/1996 | Hopenfeld | 137/15.17 |
| 5,564,464 A * | 10/1996 | Pendleton et al. | 137/393 |
| 5,564,465 A * | 10/1996 | Pettesch | 137/448 |
| 5,655,565 A | 8/1997 | Phillips et al. | |
| 5,839,465 A * | 11/1998 | Phillips et al. | 137/413 |
| 5,887,614 A * | 3/1999 | Weeks et al. | 137/421 |
| 6,138,707 A | 10/2000 | Stuart | |
| 6,206,056 B1 | 3/2001 | Lagache | |
| 6,267,156 B1 | 7/2001 | Argandona | |
| 6,318,421 B1 * | 11/2001 | Lagache | 141/198 |
| 6,523,564 B1 * | 2/2003 | Phillips | 137/430 |
| 6,523,581 B2 | 2/2003 | Pendleton et al. | |
| 6,536,465 B2 * | 3/2003 | David et al. | 137/442 |
| 6,655,418 B1 | 12/2003 | McGill et al. | |
| 6,669,413 B1 | 12/2003 | Neeld et al. | |
| 6,874,528 B2 * | 4/2005 | Kozik et al. | 137/442 |
| 6,913,047 B1 | 7/2005 | Kane et al. | |
| 2002/0179178 A1 | 12/2002 | Pendleton et al. | |
| 2004/0017081 A1 | 1/2004 | Simpson et al. | |
| 2005/0241695 A1 * | 11/2005 | Pendelton et al. | 137/448 |
| 2005/0241722 A1 * | 11/2005 | Pendleton et al. | 141/18 |
| 2005/0241723 A1 * | 11/2005 | Pendleton et al. | 141/86 |

FOREIGN PATENT DOCUMENTS

| | | |
|---|---|---|
| DE | 8802675 | 4/1988 |
| DE | 8805087 U1 | 6/1998 |
| DE | 19941820 C1 | 2/2001 |
| EP | 0437142 | 7/1991 |
| FR | 1360869 | 4/1964 |
| FR | 1377087 A | 10/1964 |
| FR | 1526790 A | 5/1968 |
| FR | 2194908 A | 3/1974 |
| FR | 2197161 A | 3/1974 |
| FR | 2205166 | 5/1974 |
| FR | 2270198 | 12/1975 |
| FR | 2331732 | 6/1977 |
| FR | 2355736 | 1/1978 |
| GB | 0966842 A | 8/1964 |
| GB | 1222364 | 2/1971 |
| GB | 1444260 | 7/1976 |
| GB | 1531083 | 1/1978 |
| GB | 2064041 A | 6/1981 |
| GB | 2309767 A | 8/1997 |

OTHER PUBLICATIONS

*OPW Instructions*—Assembly and Installation Instructions for OPW 61-SO and 61-SOM Carb Required Overfill Prevention Valves; pp. 1-11; Jan. 1993.

*Polymod® Elastomer Sealing Materials*, Chris M.A. Chilson, Jun. 15, 2000.

*Parker Total Sealing Systems*, Parker Seal Group, Irvine, CA, 1989. *Parker PolyPak Seals*.

\* cited by examiner

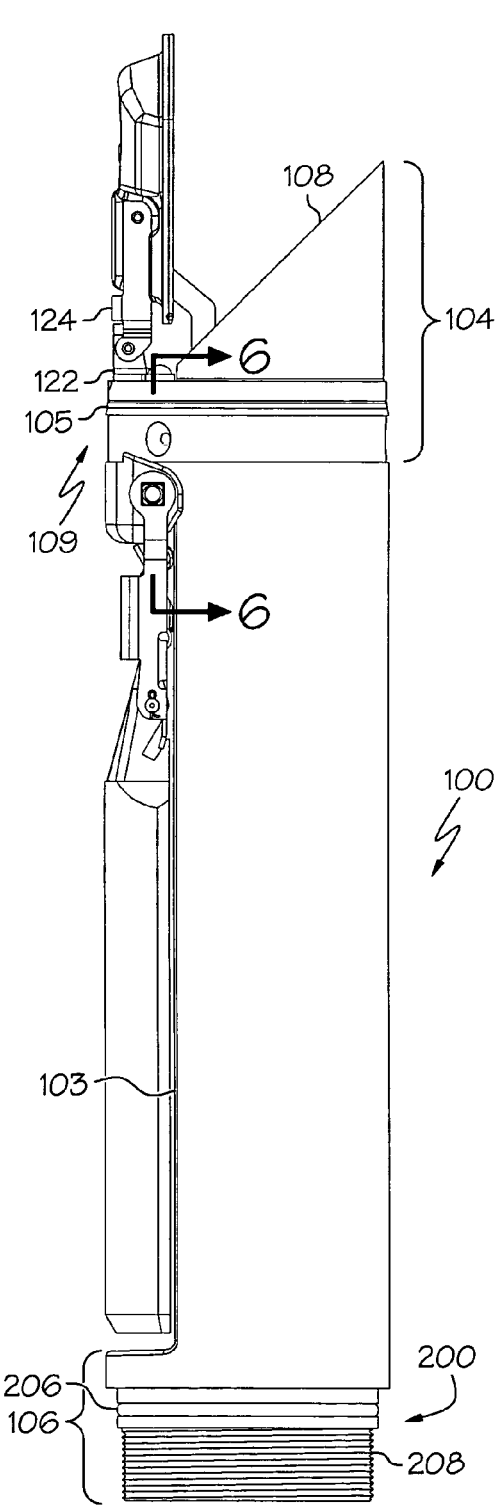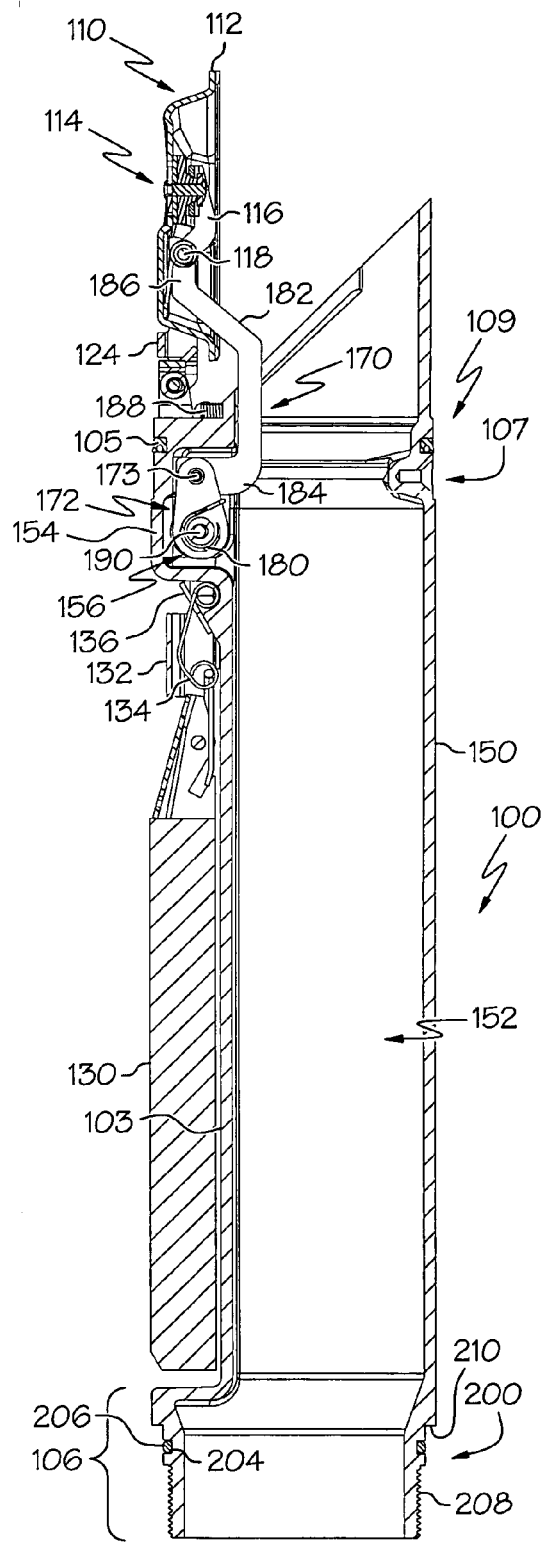

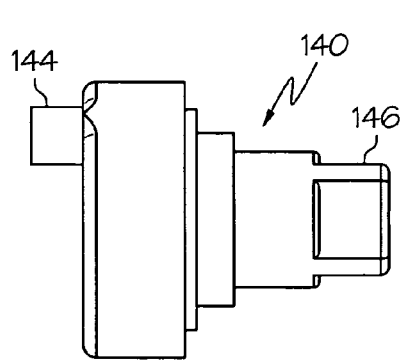
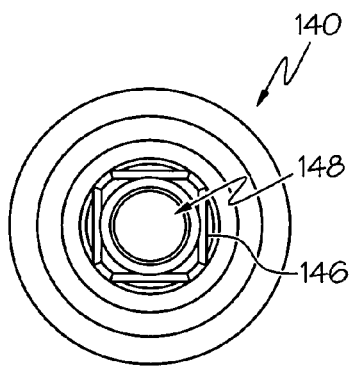
FIG. 11  FIG. 12
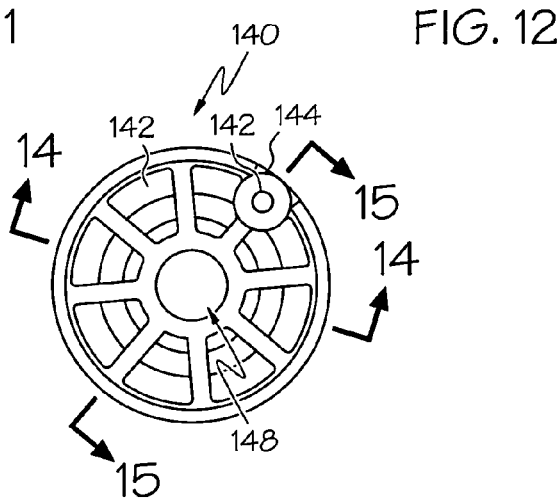
FIG. 13
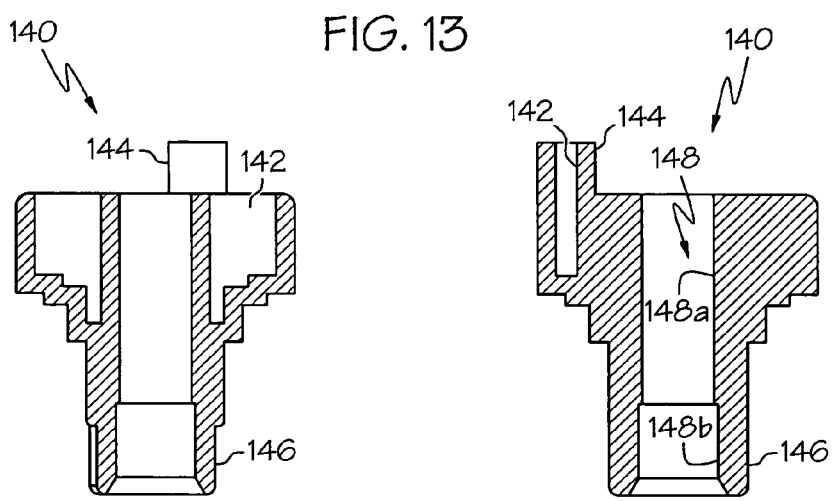
FIG. 14  FIG. 15

DROP TUBE SEGMENTS ADAPTED FOR USE WITH A LIQUID RESERVOIR

TECHNICAL FIELD

The present invention relates generally to drop tube segments, and more particularly to drop tube segments including a valve assembly for use with a liquid reservoir.

BACKGROUND OF THE INVENTION

Our increasingly mobile and mechanized society uses a variety of different fuels (e.g., gasoline, diesel fuel, ethanol, etc.) as energy. Liquid fuels are generally stored in liquid reservoirs such as underground storage tanks, above ground tanks, or any of a variety of different containers. Typically, liquid fuel reservoirs have inlets and outlets through which fuel can be added to and/or removed from the reservoir. These inlets and outlets may typically consist of a riser pipe extending from the reservoir. Internal to the riser pipe is a drop tube assembly that typically includes a drop tube segment including a valve assembly that is adapted to respond once a predetermined level is reached in the liquid reservoir. Such an exemplary valve assembly is shown, for example, in U.S. Pat. No. 4,986,320.

Such drop tube segments have proven to be very effective. To further enhance the beneficial nature of previous drop tube segments, there is a desire to provide a substantially fluid tight seal between the conduit and rotatable pivot bearings of the valve assembly. A fluid tight seal may inhibit, such as prevent, fluid (e.g., vapor) in the ullage area of the reservoir from leaking into the interior housing area of the drop tube segment. It is desirable to inhibit such fluid leakage since the interior of the drop tube segment can act as a chimney, thereby venting the leaked fluid to the surrounding atmosphere and potentially creating an environmental concern.

To address potential concerns of vapor leakage, it is known to provide a sealing arrangement for portions of a conventional drop tube segment 500 as illustrated in FIG. 7. The conventional drop tube segment 500 includes structures similar to those disclosed in the referenced patent such as a conduit with an integral sidewall. In addition, a sidewall portion 554 of the integral sidewall at least partially defines an interior housing area 556 that contains portions of a conventional valve assembly. The conventional valve assembly includes a driver member 540 and a cam member 560 that are each rotatably mounted with respect to the conduit by a shaft 590. A portion of the driver member 540 extends through an aperture 598a defined in the sidewall portion 554. Similarly, a portion of the cam member 560 extends through another aperture 598b also defined in the sidewall portion 554. As described in the referenced patent, the driver member 540 and the cam member 560 are each adapted to rotate in response to pivotal movement of a float with respect to the conduit. As further shown, the shaft 590 includes a first end portion provided with a cotter pin 593a and a second end portion provided with another cotter pin 593b in order to limit a lateral movement of the shaft 590 with respect to the conduit. The shaft 590 further includes an annular groove 591a provided with an O-ring 592a adapted to seal an interface 595a between the outer surface of the shaft 590 and an inner surface of an aperture of the driver member 540 to inhibit, such as prevent, fluid from leaking into the interior housing area 556 by way of the interface 595a. Similarly, the shaft 590 also includes another annular groove 591b provided with another O-ring 592b adapted to seal an interface 595b between the outer surface of the shaft 590 and an inner surface of an aperture of the cam member 560 to inhibit, such as prevent, fluid from leaking into the interior housing area 556 by way of the interface 595b.

The drop tube segment 500 further includes a retainer 596a adapted to be positioned, such as press fit, within the aperture 598a defined in the sidewall portion 554. The retainer 596a and the driver member 540 trap a quad ring sealing member 594a with respect to the conduit. The retainer 596a further provides a sealing surface for the quad ring sealing member 594a to seal an interface 599a between the driver member 540 and the retainer 596a to inhibit, such as prevent, fluid from leaking into the interior housing area 556 by way of the interface 599a. Similarly, the drop tube segment 500 further includes another retainer 596b adapted to be positioned, such as press fit, within the aperture 598b defined in the sidewall portion 554. The retainer 596b and the cam member 560 trap another quad ring sealing member 594b with respect to the conduit. The retainer 596b further provides a sealing surface for the quad ring sealing member 594b to seal an interface 599b between the cam member 560 and the retainer 596b to inhibit, such as prevent, fluid from leaking into the interior housing area 556 by way of the interface 599b. The retainers 596a, 596b are desirable for providing a sealing surface in applications where the conduit includes a relatively thin sidewall portion 554. Providing the sidewall portion 554 with retainers 596a, 596b has proven to be very effective. However, interfaces 597a, 597b between the retainers 596a, 596b and the respective apertures 598a, 598b in the sidewall portion 554 may not be completely fluid tight such that fluid might leak into the interior housing area 556 from an exterior location of the drop tube segment 500 by way of the interfaces 597a, 597b. For example, fluid might leak into the interior housing area 556 from an exterior location by traveling through the interface 597a between the retainer 596a and the aperture 598a. Similarly, fluid might leak into the interior housing area 556 from an exterior location by traveling through the interface 597b between the retainer 596b and the aperture 598b.

Currently, there is a need for drop tube segments that further inhibit, such as prevent, fluid from leaking into an interior area of a drop tube segment by way of one or more apertures formed in a sidewall portion that accommodate one or more pivot bearings of a valve assembly.

SUMMARY OF THE INVENTION

Accordingly, it is an aspect of the present invention to obviate problems and shortcomings of conventional drop tube segments. More particularly, it is an aspect of the present invention to provide a drop tube segment with a valve assembly including a fluid tight sealing arrangement to inhibit, such as prevent, fluid leakage to the surrounding atmosphere that might otherwise create an environmental concern.

To achieve the foregoing and other aspects and in accordance with the present invention, a drop tube segment is provided that is adapted for use with a liquid reservoir. The drop tube segment includes a conduit with an end portion and a sidewall including a sidewall portion at least partially defining an interior housing area. The drop tube segment further includes a valve assembly comprising a valve member attached to the end portion of the conduit, a float, and a linkage device pivotally connected to the valve member and adapted for communication with the float. The valve assembly further includes a driver member at least partially disposed in the interior housing area and adapted to selectively engage the linkage device. The driver member is in communication with the float such that movement of the float causes rotation of the driver member. An adjustment of the float in response to a liquid level in a liquid reservoir may rotate the driver member to engage the linkage device to facilitate in adjusting the position of the valve member with respect to the end portion of the conduit. The valve assembly further comprises a first sealing member in direct sealing engagement with both a sealing surface of the driver member and a sealing surface of the sidewall portion to inhibit fluid from leaking into the interior housing area.

To achieve further aspects and in accordance with the present invention, a drop tube segment is provided that is adapted for use with a liquid reservoir. The drop tube segment includes a conduit with an end portion and a sidewall including a sidewall portion at least partially defining an interior housing area. The drop tube segment further includes a valve assembly comprising a valve member attached to the end portion of the conduit, a float, and a linkage device pivotally connected to the valve member and adapted for communication with the float. The valve assembly further comprises a driver member at least partially disposed in the interior housing area and adapted to selectively engage the linkage device. The driver member is in communication with the float such that movement of the float causes rotation of the driver member. An adjustment of the float in response to a liquid level in a liquid reservoir may rotate the driver member to engage the linkage device to facilitate in adjusting the position of the valve member with respect to the end portion of the conduit. The valve assembly further comprises a pivot bearing at least partially disposed in the interior housing area. The pivot bearing is in communication with the float such that movement of the float causes rotation of the pivot bearing. The valve assembly further includes a sealing member in direct sealing engagement with both a sealing surface of the pivot bearing and a sealing surface of the sidewall portion to inhibit liquid from leaking into the interior housing area.

To achieve still further aspects and in accordance with the present invention, a drop tube segment is provided that is adapted for use with a liquid reservoir. The drop tube segment includes a conduit with an end portion and a sidewall including a sidewall portion at least partially defining an interior housing area. The drop tube segment further includes a valve assembly comprising a valve member attached to the end portion of the conduit, a float, and a linkage device pivotally connected to the valve member and adapted for communication with the float. The valve assembly further includes a driver member at least partially disposed in the interior housing area and adapted to selectively engage the linkage device. The driver member is in communication with the float such that movement of the float causes rotation of the driver member. An adjustment of the float in response to a liquid level in a liquid reservoir may rotate the driver member to engage the linkage device to facilitate in adjusting the position of the valve member with respect to the end portion of the conduit. The valve assembly further includes a pivot bearing at least partially disposed in the interior housing area. The pivot bearing is in communication with the float such that movement of the float causes rotation of the pivot bearing. The valve assembly also includes a shaft with a first portion that extends through an aperture in the driver member, a second portion that extends through an aperture in the linkage device and a third portion that extends through an aperture of the pivot bearing. The aperture of the driver member and the aperture of the pivot bearing are each provided with a fluid tight closed end that cooperate together to trap the shaft with respect to the conduit.

Advantages and novel features of the present invention will become apparent to those skilled in the art from the following detailed description, which simply illustrates various modes and examples contemplated for carrying out the invention. As will be realized, the invention is capable of other different aspects, all without departing from the invention. Accordingly, the drawings and descriptions are illustrative in nature and not restrictive.

BRIEF DESCRIPTION OF THE DRAWINGS

While the specification concludes with claims particularly pointing out and distinctly claiming the present invention, it is believed that the same will be better understood from the following description, taken in conjunction with the accompanying drawings, in which:

FIG. 4 is a right side elevational view of the drop tube segment of FIG. 1;

FIG. 5 is a sectional view of the drop tube segment along line 5—5 of FIG. 1;

FIG. 11 illustrates a front elevational view of a driver member from the drop tube assembly of FIG. 1;

FIG. 12 illustrates a right side elevational view of the driver member of FIG. 11;

FIG. 13 illustrates a left side elevational view of the driver member of FIG. 11;

FIG. 14 illustrates a sectional view of the driver member along line 14—14 of FIG. 13;

FIG. 15 is a sectional view of the driver member along line 15—15 of FIG. 13.

DETAILED DESCRIPTION OF EXEMPLARY EMBODIMENTS

The various exemplary embodiments of the invention may be used to provide a valve system for a wide variety of applications. For example, the various exemplary embodiments of the invention may be used to provide overfill valve systems for use in a liquid reservoir, such as a liquid storage tank. In one particular example, features of the exemplary embodiments herein may be used in addition, or in place of, features disclosed in U.S. Pat. No. 4,986,320, which is herein incorporated entirely by reference. U.S. Pat. No. 4,986,320 is referred to throughout this application as "the referenced patent".

Figure 1:
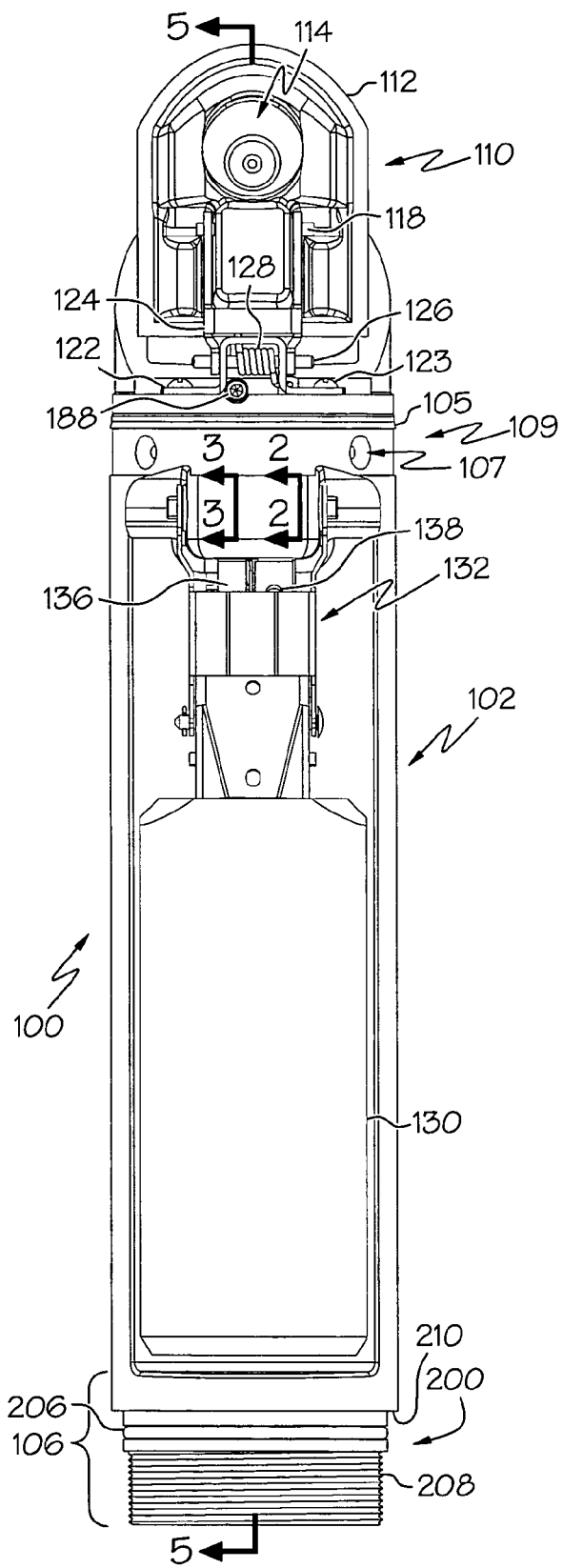
FIG. 1 is a front elevational view of a drop tube segment in accordance with one exemplary embodiment of the present invention.
Figure 2:
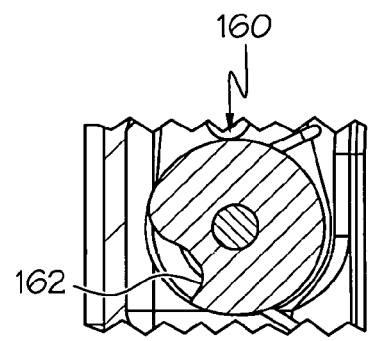
FIG. 2 is a sectional view of the drop tube segment along line 2—2 of FIG. 1, illustrating portions of an exemplary cam member.

Attention will now be directed to various exemplary embodiments of the invention. Concepts of exemplary embodiments are illustrated in the accompanying drawings, wherein like numerals indicate the same elements throughout the views. With reference to FIGS. 1, 4 and 5, a drop tube segment 100 in accordance with one embodiment of the present invention is disclosed. The drop tube segment 100 includes a conduit 102 with a first end portion 104 and a second end portion 106.

Figure 16:
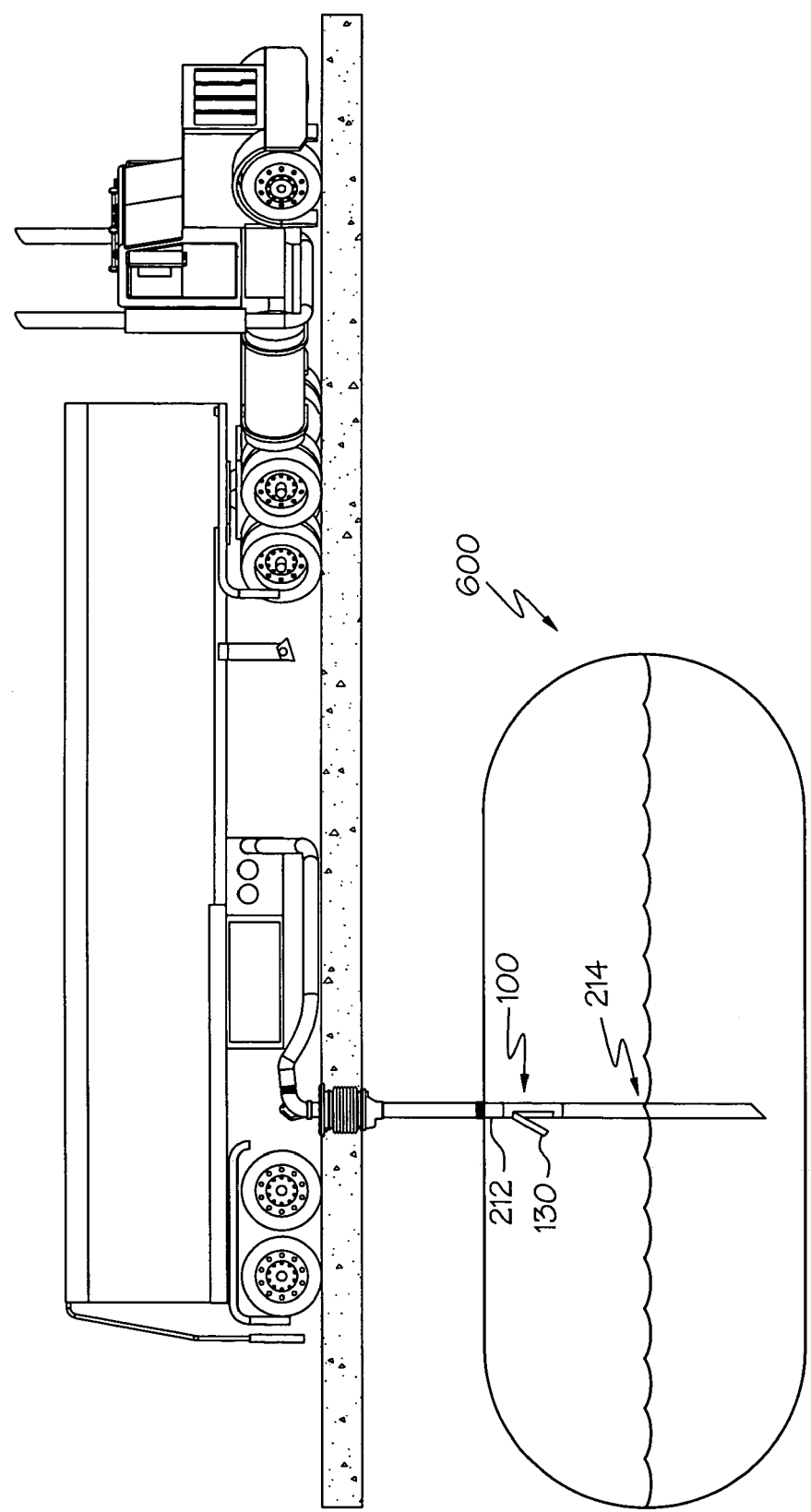
FIG. 16 illustrates an exemplary overfill valve system installed with respect to a liquid reservoir in accordance with the present invention.

The first end portion 104 may further include a fastening section 109 with a fastener receiving structure 107 adapted to facilitate attachment between the drop tube segment 100 and another drop tube segment that may be arranged as an upper drop tube segment 212 in a liquid reservoir 600 as illustrated in FIG. 16. As illustrated, the fastening section 109 may further include a sealing member 105 adapted to provide a fluid tight connection between the drop tube segment 100 and the upper drop tube segment 212.

The second end portion 106 may include another fastening section adapted to facilitate attachment between the drop tube segment 100 and a further drop tube segment that may be arranged as a lower drop tube segment 214 in the liquid reservoir 600 as illustrated in FIG. 16. The fastening section can further include a sealing member adapted to inhibit, such as prevent, fluid from leaking into the internal conduit area. Various alternative fastening sections may be used to attach the drop tube segment 100 to the lower drop tube segment 214. As shown in FIGS. 1, 4 and 5, an exemplary fastening section 200 is located at the second end portion 106 of the conduit 102 and includes a sealing surface for engaging a sealing member 206. For example, as shown, the fastening section 200 may comprise an optional groove 204 that includes the sealing surface (e.g., the base and/or one or more sides of the groove) wherein the sealing member 206 is at least partially disposed in the groove 204 to engage the sealing surface. As shown, the groove 204 can comprise an annular groove but might comprise other shapes depending on the particular application. The fastening section 200 may further include a threaded portion 208 including exterior threads adapted to engage interior threads of the lower drop tube segment 214 to facilitate fastening between the drop tube segment 100 and the lower drop tube segment 214. The fastening section 200 of the drop tube segment 100 may also include a shoulder 210 that can act as a registration stop to limit the extent to which the lower drop tube segment 214 may be threaded on the drop tube segment 100.

As shown, the conduit 102 can be formed with a sidewall 150 that at least partially defines an internal conduit area 152 from the first end portion 104 to the second end portion 106. The sidewall 150 also includes a sidewall portion 154 that at least partially defines an interior housing area 156 of the internal conduit area 152 that contains portions of a valve assembly 110. The sidewall 150 can comprise a substantially continuous sidewall in that the sidewall comprises a one-piece sidewall with the individual portions of the sidewall being integral with one another. Providing the sidewall as a substantially continuous sidewall can reduce manufacturing costs and can facilitate to inhibit, such as prevent, fluid leakage into the internal conduit area 152 from a location external to the conduit 102. The sidewall 150 may be formed from a wide variety of materials and by various processes. In one exemplary embodiment, the sidewall 150 may be formed from aluminum with a casting process.

As shown, the exemplary sidewall 150 can have a general cylindrical shape and may include a notched portion 103 to accommodate a float 130 as shown in FIGS. 4 and 5. Furthermore, the interior housing area 156 might be offset from a main fluid path of the internal conduit area 152, as shown in FIG. 5, to minimize interference of the referenced portions of the valve assembly 110 with liquid that may flow along a liquid path within the internal conduit area 152 in use. In further exemplary embodiments, the internal housing area 156 may comprise a nonrecessed portion of the internal conduit area 152 and may simply refer to the area where referenced portions of the valve assembly 110 are placed in the internal conduit area 152.

The drop tube segment 100 further includes a valve assembly, such as the exemplary valve assembly 110 illustrated and described herein. The concepts of the present invention can alternatively be used with various conventional valve assembles. For example, general features and concepts of the conventional valve assembly described in the referenced patent may be incorporated in the drop tube segment 100 for use with the inventive concepts of the present invention.

As shown in FIGS. 1, 4, 5 and 8, the exemplary valve assembly 110 includes a one-niece mounting bracket 122 for attachment to the first end portion 104 of the conduit 102. As shown, a pair of screws 123 may be used to fasten the one-piece mounting bracket 122 to the first end portion 104. The valve assembly 110 further includes a valve member 112. As shown, the one-piece mounting bracket 122 is used to associate the valve member 112 with the first end portion 104 of the conduit 102. The one-piece mounting bracket 122 facilitates pivotal association between the valve member 112 and the first end portion 104 such that the valve member 112 may pivot to engage a valve seat 108 of the conduit 102. An H-shaped pivot link 124 may also be used to pivotally associate the valve member 112 with respect to the first end portion 104. As shown, one end portion of the H-shaped pivot link 124 may be pivotally attached to the valve member 112 with a shaft 118 while the other end portion of the H-shaped pivot link 124 may be pivotally attached to the one-piece mounting bracket 122 with another shaft 126. A torsion spring 128 is adapted to bias the valve member 112 out of a closed position against the valve seat 108.

Figure 8:
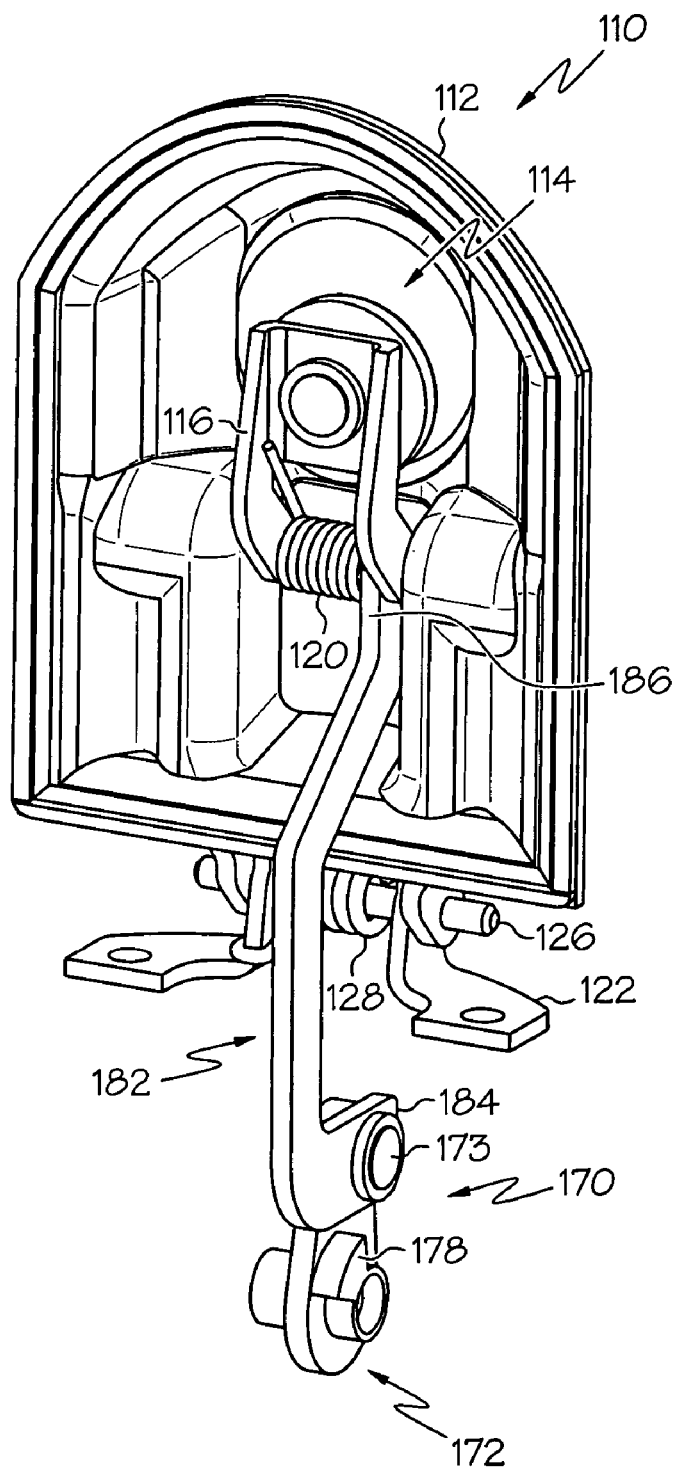
FIG. 8 illustrates a perspective view of the valve member and linkage device from the drop tube segment of FIG. 1.

The valve member 112 can also be provided with a poppet valve 114 similar to the valve member and poppet valve disclosed in the reference patent. The poppet valve 114 includes a pivot link 116 and is provided with a torsion spring 120 to bias the poppet valve 114 to a closed position as shown in FIG. 8. The shaft 118 is also adapted to pivotally attach the poppet valve 114 to the valve member 112.

Figure 6:
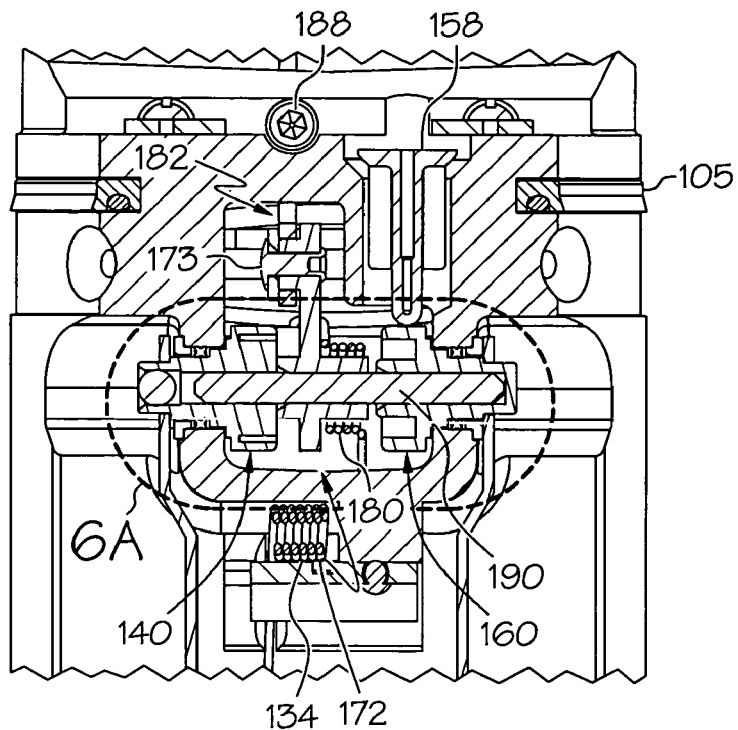
FIG. 6 is a sectional view of the drop tube segment along line 6—6 of FIG. 4.
Figure 6A:
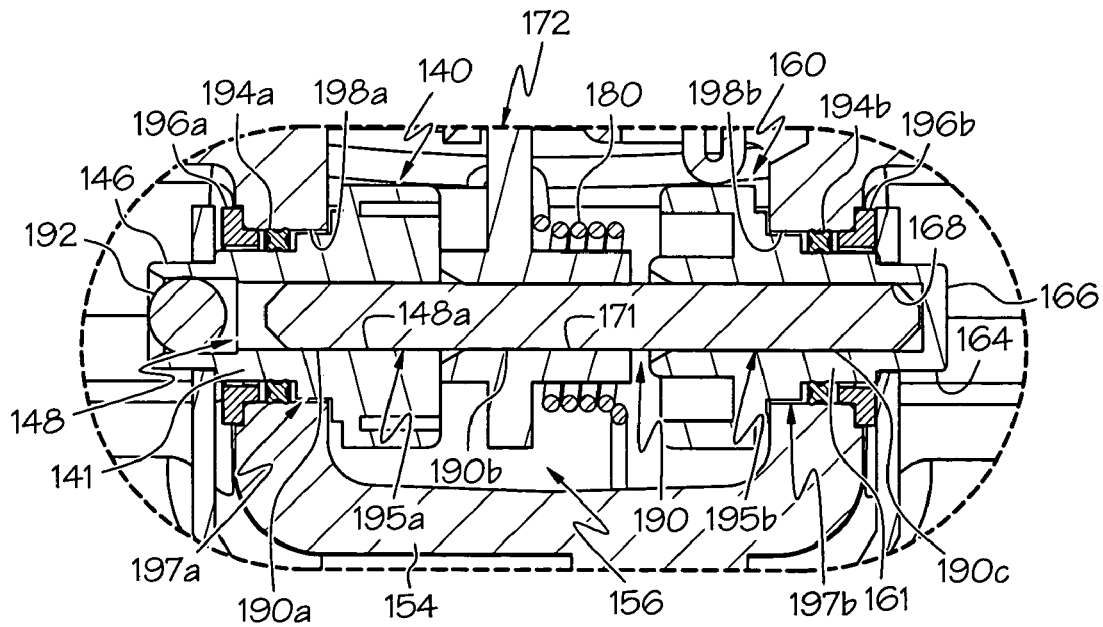
FIG. 6A is an enlarged view of portions of an exemplary valve assembly taken at view 6A of FIG. 6.

As illustrated in FIGS. 5 and 8, the valve assembly 110 further includes a linkage device 170 that is pivotally connected with respect to the valve member 112 and adapted for communication with the float 130 such that the float may facilitate in adjusting the position of the valve member 112 with respect to the first end portion 104 of the conduit 102 in response to a liquid level in the liquid reservoir 600. The linkage device 170 can include a first link 172 and a second link 182. The second link 182 includes a first end portion 184 attached to the first link 172 with a pivot pin 173 and a second end portion 186 attached to the valve member 112 with the shaft 118. As shown in FIGS. 6 and 6A, the first link 172 is also rotatably mounted with respect to the conduit 102 with a shaft 190 that extends through an aperture 171 of the first link 172.

The linkage device 170 is further provided with a torsion spring 180 for biasing the valve member 112 to the open position illustrated in FIGS. 1, 4 and 5. As shown, an adjustable stop member 188 may also be provided to limit movement of the second link 182. As discussed in the referenced patent, it may be desirable to position the adjustable stop member 188 such that the pivot pin 173 is located off-center with respect to the shaft 190. For example, as shown in FIG. 5, the pivot pin 173 is permitted to rotate sufficiently counter clockwise such that it is located in an off-center position with respect to the shaft 190. The off-center position effectively locks the valve member 112 in the open position to resist movement in response to a downward force applied to the valve member 112.

The valve assembly 110 further includes the previously-mentioned float 130 that facilitates adjustment of the position of the valve member 112 with respect to the first end portion 104 of the conduit 102 in response to a liquid level in the liquid reservoir 600. As shown in FIG. 5, the float 130 may be biased outwardly by a biasing spring 134. The biasing spring 134 may press against a float link 132 to initially bias the float 130 into the angular position illustrated in FIG. 16. Biasing the float 130 to an initial angular position increases the lever angle of the float 130 to allow a reliable response to a predetermined liquid level in the liquid reservoir that might not otherwise occur if the float 130 is retracted within the notch portion 103 of the conduit 102. As shown in FIG. 1, a spring retainer 136 may be fastened to the conduit 102 with a fastener 138 to position the biasing spring 134 with respect to the conduit 102.

Figure 9:
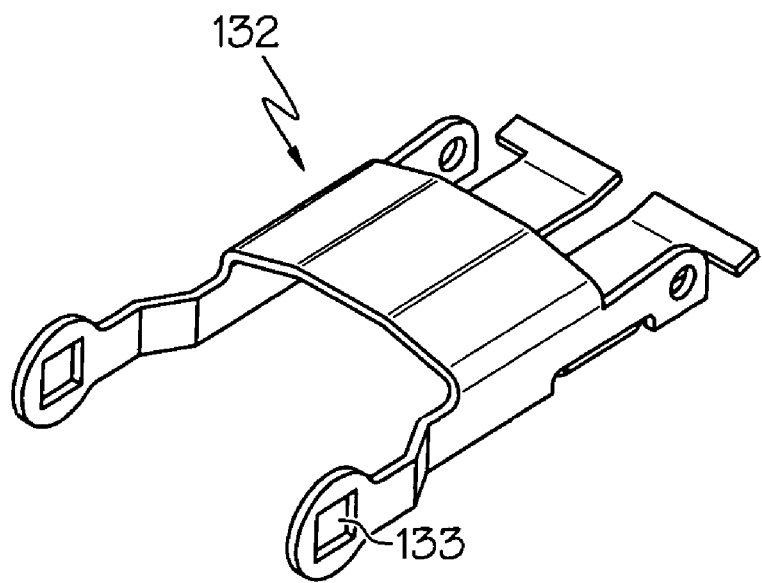
FIG. 9 is a perspective view of the float link of the drop tube segment of FIG. 1.
Figure 10:
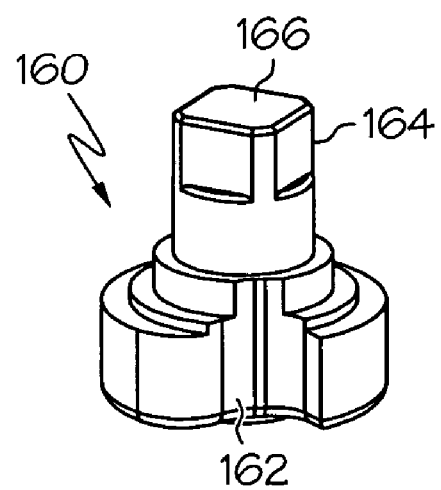
FIG. 10 illustrates a perspective view of the cam member from the drop tube segment of FIG. 1.

The float 130 may comprise an elongated body molded from any suitable material and may further include the previously-mentioned float link 132 designed to act as a safety link to provide a failure point to prevent otherwise expensive damage that might occur if the float 130 is forced to an over-pivoted position. As shown in FIG. 9, the float link 132 includes a pair of noncircular apertures 133 adapted to engage pivot bearings of the drop tube segment 100. Various different types and numbers of pivot bearings may be used with the principles of the present invention that are adapted to communicate a motion of the float 130 to other parts of the drop tube segment 100 to perform an appropriate function. Although not shown, drop tube segments in accordance with the present invention might only have a single pivot bearing (e.g., a single driver member or other pivot bearing). Still further, three or more pivot bearings might be provided in still further embodiments. The illustrated embodiment includes two pivot bearings, wherein one pivot bearing comprises a driver member 140 and the other pivot bearing comprises a cam member 160. A wide variety of driver members and/or cam members may be used with the concepts of the present invention. In one exemplary embodiment, the driver member and/or cam member disclosed in the referenced patent may be used with the concepts of the present invention. Further examples of driver members and/or a cam members that can be used with the concepts of the present invention are described with reference to FIGS. 6, 6A, 6B, 6C and 10–15. One or more of the pivot bearings might be adapted to nonrotatably engage a corresponding one of the noncircular apertures of the float link. As shown in FIG. 6A, for example, the driver member 140 and the cam member 160 are each adapted to nonrotatably engage a corresponding one of the noncircular apertures 133 of the float link 132 such that a pivoting movement of the float 130 causes a corresponding rotational movement of each of the driver member 140 and the cam member 160 about a pivot axis.

Figure 3:
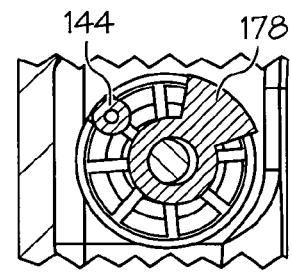
FIG. 3 is a sectional view of the drop tube segment along line 3—3 of FIG. 1, illustrating portions of an exemplary driver member and linkage device.

As shown in FIGS. 11–15, the driver member 140 can include a noncircular coupling extension 146 having a shape for cooperation with one of the noncircular apertures 133 of the float link 132 to be nonrotatably received therein. The driver member 140 further includes a drive pin 144 that is offset from a rotational axis of the driver member 140. The drive pin 144 is adapted to engage an extension 178 of the linkage device 170 (see FIGS. 3 and 8) when the float 130 sufficiently pivots relative to the conduit 102 in a manner similar to the arrangement disclosed in the referenced patent. The driver member 140 further includes a through aperture 148 with a first portion 148*a* adapted to receive a portion of the shaft 190. The aperture 148 can also be provided with a fluid tight closed end. For example, as shown in FIG. 6A, the fluid tight closed end can comprise a closure member 192.

The closure member, if provided, can optionally be preformed into a wide range of shapes for attachment with respect to the aperture in order to provide the aperture with a fluid tight closed end. For example, the closure member might comprise a conical shape, cylindrical shape, or other suitable shape. In the particular illustrated embodiment, the closure member 192 comprises a spherical-shaped closure member. The closure member may also be attached with respect to the aperture in a wide variety of ways. For example, an adhesive may be used to attach the closure member with respect to the aperture. In further embodiments, the closure member may be attached with a welding process (e.g., tack weld, sonic welding, etc.). In additional embodiments, the closure member may comprise a cap that is screwed or otherwise fastened with respect to the aperture. The closure member might also include a plug with a seal such as an O-ring elastomeric seal. Still further, the closure member may be attached with an interference fit with a portion of the aperture to form the fluid tight closed end. For example, as shown, the closure member 192 is press fit within a second portion 148*b* of the aperture 148 of the driver member 140 to form a press-fit closure.

In further embodiments, the closure member might not be preformed but can be applied with respect to the aperture to provide a fluid tight closed end. For example, the closure member can be formed during a fill welding process wherein welding material is introduced for subsequent solidification to provide the fluid tight closed end. In additional embodiments, the closure member might comprise an epoxy or other fluid or pliable material that is initially pliable or in a fluid form but later solidifies to provide an appropriate fluid tight closed end.

The closure member 192 and the driver member 140 can be formed from a wide variety of materials such as stainless steel, aluminum, plastics, rubbers, or other material that has the ability to provide sufficient corrosion resistance when exposed to fluid used in association with the liquid reservoir. In one particular embodiment, the closure member 192 may comprise stainless steel to provide a press-fit closure. In another example, the driver member 140 may comprise a Celcon or BASF material to further provide wear resistance. The driver member 140 may also include a plurality of hollow areas 142 to provide a substantially constant wall thickness to facilitate formation of the driver member 140 by an injection molding process.

An exemplary cam member 160 is shown in FIGS. 2, 6, 6A and 10 and can be formed from the same or similar material used to form the driver member 140 discussed above. The cam member 160 can include a noncircular coupling extension 164 having a shape for cooperation with one of the noncircular apertures 133 of the float link 132 to be nonrotatably received therein. The cam member 160 further includes a cam surface 162 adapted to control the position of a poppet valve 158 in a manner similar to the poppet valve disclosed in the referenced patent. As shown in FIG. 6A, the cam member 160 may further include an aperture 168 designed to receive a portion of the shaft 190. The aperture 168 may also be provided with a fluid tight closed end. For example, the fluid tight closed end can comprise an integrally closed end 166.

The fluid tight closed ends of the driver member 140 and the cam member 160 are adapted to trap the shaft 190 between the fluid tight closed ends in order to provide an appropriate pivot axis. As shown in FIG. 6A, the trapped shaft 190 includes a first portion 190a that is positioned within the first portion 148a of the aperture 148 of the driver member 140, a second portion 190b that is positioned within the aperture 171 of the linkage device 170, and a third portion 190c that is positioned within the aperture 168 of the cam member 160.

The fluid tight closed ends also inhibit, such as prevent, fluid from leaking into the interior housing area 156 from a location external to the conduit 102. For instance, as shown, the closure member 192 inhibits, such as prevents, fluid from leaking into the interior housing area 156 from a location external to the conduit 102 by way of an interface 195a between an outer surface of the shaft 190 and an inner surface of the aperture 148 of the driver member 140. Similarly, the integrally closed end 166 prevents fluid from leaking into the interior housing area 156 from a location external to the conduit 102 by way of an interface 195b between an outer surface of the shaft 190 and an inner surface of the aperture 168 of the cam member 160.

In the exemplary embodiment discussed above, the driver member 140 includes a fluid tight closed end comprising a closure member 192 while the cam member 160 includes a fluid tight closed end comprising the integrally closed end 166. In alternative embodiments, the fluid tight closed end of the driver member 140 might include an integrally closed end while the fluid tight closed end of the cam member 160 might include a closure member as described above. Still further, the driver member and cam member might each be provided with a fluid tight closed end comprising a closure member as described above. However, providing one of the fluid tight closed ends as an integrally closed end can simplify assembly and reduce assembly time as only one of the fluid tight closed ends may need to be closed during assembly.

Accordingly, as set forth above, FIG. 6A provides structure that inhibits, such as prevents, fluid leakage into the interior housing area 156 by way of the interfaces 195a, 195b. As further illustrated in FIG. 6A, the drop tube segment 100 further comprises structure to inhibit, such as prevent, fluid from leaking into the interior housing area 156 by way of an interface 197a between the driver member 140 and the sidewall portion 154. As shown, a sealing member 194a can be placed in direct sealing engagement with both a sealing surface of the driver member 140 and a sealing surface of the sidewall portion 154 to inhibit, such as prevent, fluid from leaking into the interior housing area 156. In the illustrated example, the driver member 140 comprises a hub 141 that at least partially extends within an aperture 198a of the sidewall portion 154. With this arrangement, the sealing surface of the sidewall portion 154 can comprise an inner surface of the aperture 198a while the sealing surface of the driver member 140 can comprise an outer surface of the hub 141.

The drop tube segment 100 still further comprises structure to inhibit, such as prevent, fluid from leaking into the interior housing area 156 by way of an interface 197b between the cam member 160 and the sidewall portion 154. As shown, a sealing member 194b can be placed in direct sealing engagement with both a sealing surface of the cam member 160 and another sealing surface of the sidewall portion 154 to inhibit, such as prevent, fluid from leaking into the interior housing area 156. In the illustrated example, the cam member 160 comprises a hub 161 that at least partially extends within an aperture 198b of the sidewall portion 154. With this arrangement, the sealing surface of the sidewall portion 154 can comprise an inner surface of the aperture 198b while the sealing surface of the cam member 160 can comprise an outer surface of the hub 161.

Respective retainers 196a, 196b may also be provided to trap the sealing members 194a, 194b into position while also providing a bearing surface for the float link 132. For example, in order to trap the sealing members 194a, 194b, the retainers 196a, 196b may be attached relative to the apertures 198a, 198b in a wide variety of ways. For example, an adhesive may be used to attach the retainers with respect to the corresponding apertures. In further embodiments, the retainers may be attached with a welding process (e.g., tack weld, sonic welding, etc.). In further examples, the retainers may be formed as part of the sidewall portion 154. In additional embodiments, the retainers may have a threaded portion for threaded attachment. Still further, the retainers may be attached with an interference fit with a portion of the corresponding apertures. For example, as shown, the retainers 196a, 196b can each have an extension that is press fit into a corresponding one of the apertures 198a, 198b of the sidewall portion 154. In exemplary embodiments of the present invention, retainers may not be provided. For example, the pivot bearings (e.g., cam member, driver member, and/or other pivot bearing) may include a groove to locate the sealing members.

Figure 6B:
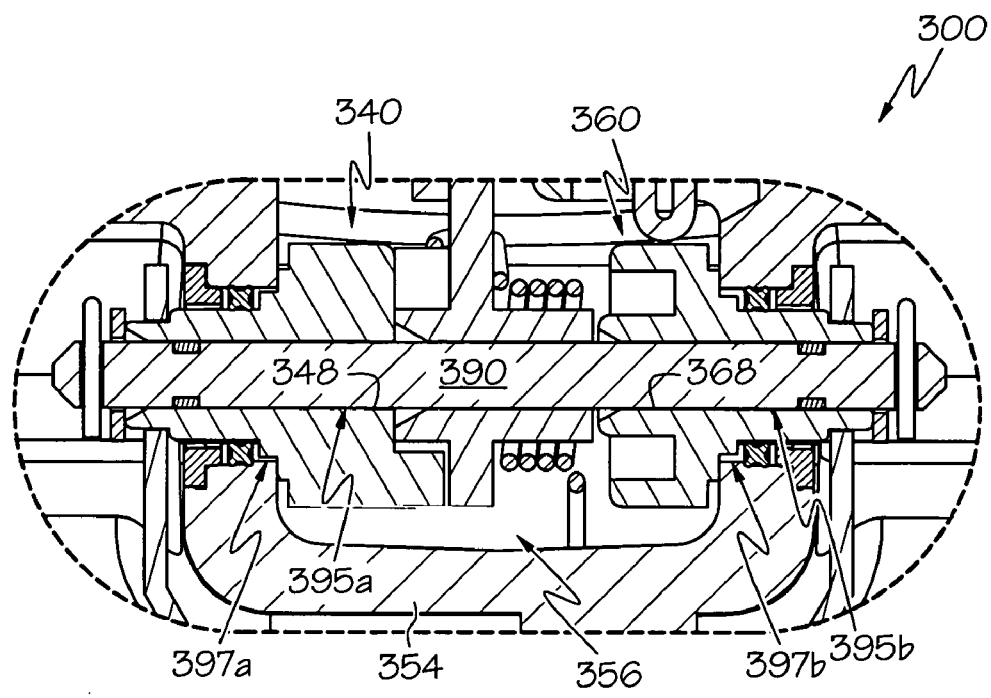
FIG. 6B is an enlarged view illustrating portions of another valve assembly in accordance with another embodiment of the present invention.
Figure 7:
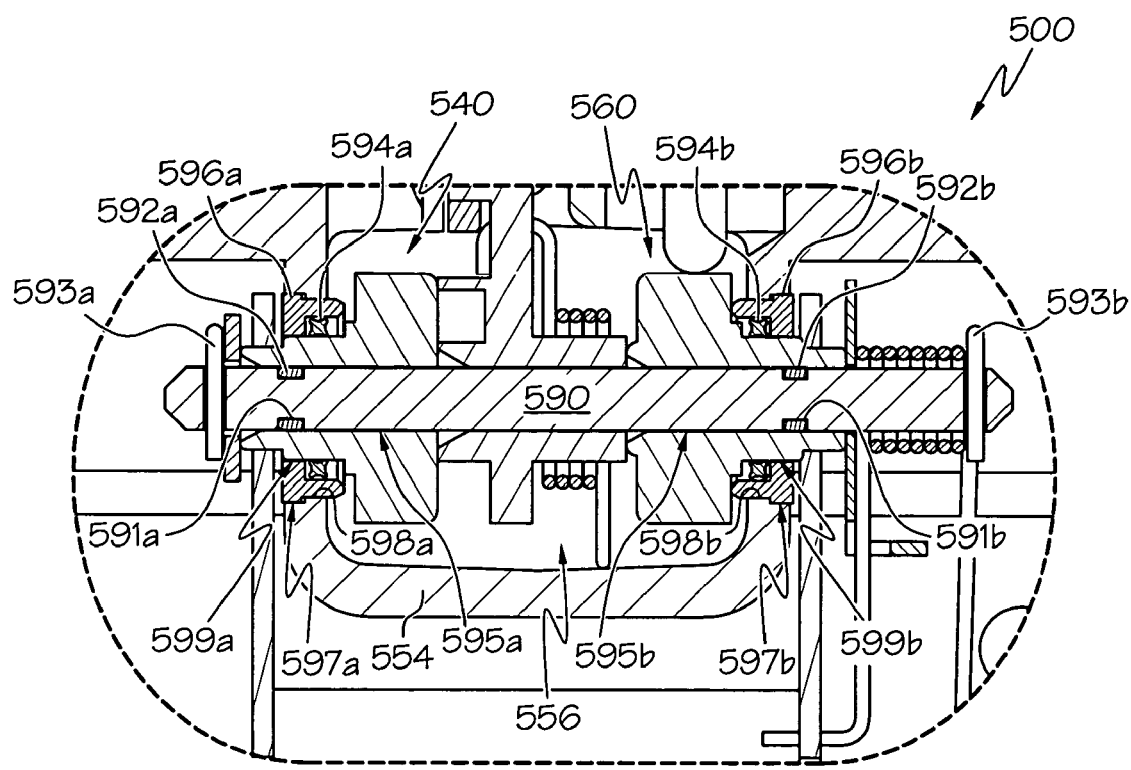
FIG. 7 is an enlarged view illustrating portions of a conventional valve assembly.

As shown, FIG. 6B illustrates portions of a drop tube segment 300 including structure, identical to the structure disclosed in FIG. 6A above, that is designed to inhibit, such as prevent, fluid leakage into the interior housing area 356 by way of an interface 397a between a driver member 340 and a sidewall portion 354 and by way of an interface 397b between a cam member 360 and the sidewall portion 354. Unlike FIG. 6A, FIG. 6B further provides alternative structure, similar to the structure illustrated in FIG. 7, that might be used to inhibit, such as prevent, fluid leakage into the interior housing area 356 by way of the interfaces 395a, 395b between the outer surface of a shaft 390 and corresponding inner surfaces of apertures 348, 368 respectively defined in the driver member 340 and the cam member 360.

Figure 6C:
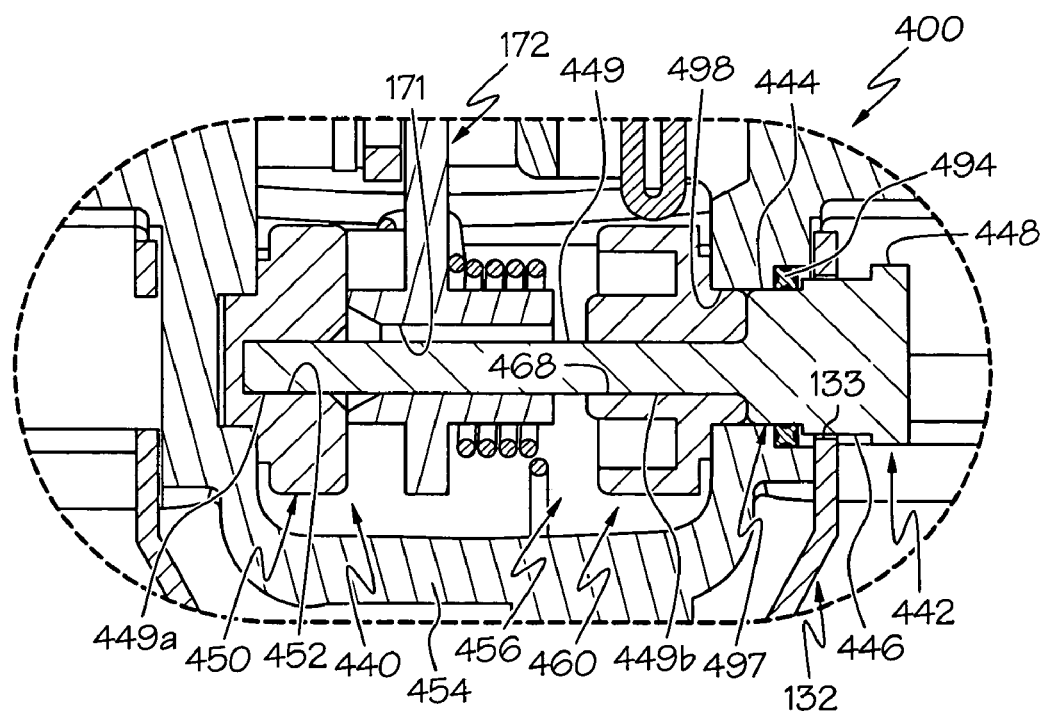
FIG. 6C is an enlarged view illustrating portions of another valve assembly in accordance with still another embodiment of the present invention.

FIG. 6C illustrates portions of a further drop tube segment 400 in accordance with additional exemplary embodiments of the present invention that is designed to inhibit, such as prevent, fluid leakage into the interior housing area 456.

As discussed above, embodiments of the present invention may have a plurality of apertures in the sidewall portion. In additional embodiments, the sidewall portion might comprise a single aperture to minimize the opportunities for fluid leakage into the interior housing area. For example, as shown in FIG. 6C, the sidewall portion 454 might include a single aperture 498. However, it is contemplated that the embodiment of FIG. 6C might alternatively include a plurality of apertures in accordance with further exemplary embodiments of the present invention.

The drop tube segment 400 includes a driver member 440 with a first portion 442 and a second portion 450. The first portion 442 engages the second portion 450 to provide communication between the second portion 450 and the float 130 such that movement of the float 130 causes rotation of the first portion 442 together with the second portion 450. As shown, the first portion 442 of the driver member 440 includes a first coupling member 446 having a shape for cooperation with one of the noncircular apertures 133 of the float link 132 to be nonrotatably received therein. Therefore, the first portion 442 of the driver member 440 may be adapted to nonrotatably engage a corresponding noncircular aperture 133 of the float link 132 such that a pivoting movement of the float 130 causes a corresponding rotational movement of the first portion 442 of the driver member 440 about a pivot axis.

As further illustrated in FIG. 6C, the first portion 442 of the driver member 440 might also include a second coupling member 449 adapted to engage the second portion 450 of the driver member 440 to provide communication between the second portion 450 and the float 130 such that movement of the float 130 causes rotation of the first portion 442 together with the second portion 450. In one particular embodiment, the second coupling member 449 might permit the first portion 442 to have a keyed engagement with the second portion 450. For example, the coupling member 449 may include a first location 449a having a shape for cooperation with a noncircular aperture 452 defined in the second portion 450 of the driver member 440. While a wide variety of shapes may be provided, the illustrated example shows the first location 449a including a D-shaped surface for cooperation with a corresponding D-shaped aperture 452 in the second portion 450 of the driver member 440. In additional embodiments, set pins, screws, or other fastening devices may be used, in addition or alternatively, to provide appropriate engagement between the first portion and the second portion of the driver member.

In additional embodiments, the first portion 442 of the driver member 440 might engage a pivot bearing to provide communication between the pivot bearing and the float such that movement of the float causes rotation of the first portion 442 of the driver member 440 together with the pivot bearing. Any number and/or alternative types of pivot bearings might be provided and can perform alternative functions based on movement of the float. For example, as shown in FIG. 6C, the pivot bearing comprises a cam member 460. In certain embodiments, the second coupling member 449 might permit the first portion 442 to have a keyed engagement with the pivot bearing (e.g., cam member). For example, the coupling member 449 may include a second location 449b having a shape for cooperation with a noncircular aperture 468 defined in the cam member 460. While a wide variety of shapes may be provided, the illustrated example shows the second location 449b including a D-shaped surface for cooperation with a corresponding D-shaped aperture 468 in the cam member 460. Moreover, the second coupling member 449 might be adapted to provide simultaneous engagement with the second portion 450 of the driver member 440 and the cam member 460 such that movement of the float causes rotation of the first portion together the second portion and the pivot bearing (e.g., cam member). As shown, the coupling member 449 might comprise an elongated D-shaped member including the first location 449a for cooperation with the corresponding D-shaped aperture 452 of the second portion 450 in addition to the second location 449b for cooperation with the corresponding D-shaped aperture 468 in the cam member 460. In contrast, the aperture 171 of the first link 172 may comprise a circular aperture for rotatable coupling with respect to the second coupling member 449. The first portion 442 of the driver member 440 may be held in position by a press fit engagement with the second portion 450 of the driver member 440. The first portion 442 may also include an enlarged head 448 to maintain cooperation between the first coupling member 446 and the noncircular aperture 133.

While a keyed engagement is illustrated and described in the illustrated embodiment it is understood that a wide variety of engagement devices might be used, alternatively or in addition, to the keyed engagement. For example, set pins, screws, or other fastening devices may be used, in addition or alternatively, to provide appropriate engagement.

The drop tube segment 400 still further comprises structure to inhibit, such as prevent, fluid from leaking into the interior housing area 456 by way of an interface 497 between the first portion 442 of the driver member 440 and the sidewall portion 454. As shown, a sealing member 494 can be placed in direct sealing engagement with both a sealing surface of the driver member 440 (e.g., the first portion 442 of the driver member) and another sealing surface of the sidewall portion 454 to inhibit, such as prevent, fluid from leaking into the interior housing area 456. In the illustrated example, the first portion 442 of the driver member 440 includes a hub 444 that at least partially extends within the aperture 498 of the sidewall portion 454. With this arrangement, the sealing surface of the sidewall portion 454 can comprise an inner surface of the aperture 498 while the sealing surface of the driver member 440 can comprise an outer surface of the hub 444.

The hub 444 permits the first portion 442 of the driver member 440 to be rotatably mounted with respect to the aperture 498 of the sidewall portion 454. As shown, the second portion 450 of the driver member 440 includes a protrusion rotatably received in a cavity defined at another location of the sidewall portion 454. As discussed previously, the first coupling member 446 is adapted to cooperate with one of the noncircular apertures 133 (on the right side of FIG. 6C). Although not shown, the sidewall portion 454 may also include a protrusion adapted to be rotatably received in the other aperture 133 of the float link 132 (on the left side of FIG. 6C).

Sealing members described throughout this application can comprise a wide range of shapes and can be formed from a wide variety of materials to define various alternative sealing member structures. For example, the sealing members corresponding to the interfaces 395a and 395b can comprise resilient annular O-rings like those disclosed as reference numbers 592a, 592b in FIG. 7. In further examples, the sealing members 194a, 194b of FIG. 6A and the identical sealing members corresponding to the interfaces 397a, 397b illustrated in FIG. 6B can comprise quad ring sealing members.

Each of the sealing members throughout this application might be formed with alternative structures including a variety of alternative shapes and materials. Sealing members described throughout this application can comprise a resilient seal such as an O-ring, or the like, and can be formed a wide variety of materials such as an elastomer. Certain sealing members might comprise a PolyPak® seal available from Parker-Hannifin, Corp. Additional sealing members might comprise a nonannular shape, for example, to match the corresponding shape of the sealing surface. In addition, the sealing members may comprise a resilient sealing member that are formed from a wide range of materials. For example, resilient sealing members might be formed from elastomer (e.g., rubber) or other resilient material. Still further, the sealing members might comprise a nonresilient sealing member. For example, a nonresilient sealing member might be used wherein the seal is obtained by compressing, such as crushing the sealing member.

The foregoing description of the various examples and embodiments of the invention has been presented for the purposes of illustration and description. It is noted that a wide variety of additional embodiments may incorporate the concepts of the present invention. For example, additional embodiments of the invention may include inventive concepts presented herein in combination with features and concepts disclosed in U.S. Pat. No. 4,986,320. The description of the various examples and embodiments of the invention is not intended to be exhaustive or to limit the invention to the precise form disclosed. Many alternatives, modifications and variations will be apparent to those skilled in the art. Accordingly, this invention is intended to embrace all alternatives, modifications and variations that have been discussed herein, and others that fall within the spirit and broad scope of the claims.

We claim:

1. A drop tube segment adapted for use with a liquid reservoir, the drop tube segment comprising:
    a) conduit including an end portion and a sidewall including a sidewall portion at least partially defining an interior housing area;
    b) valve assembly including:
        i) a valve member attached to the end portion of the conduit;
        ii) a float;
        iii) a linkage device pivotally connected to the valve member and adapted for communication with the float;
        iv) a driver member at least partially disposed in the interior housing area and adapted to selectively engage the linkage device, the driver member in communication with the float such that movement of the float causes rotation of the driver member, wherein an adjustment of the float in response to a liquid level in a liquid reservoir may rotate the driver member to engage the linkage device to facilitate in adjusting the position of the valve member with respect to the end portion of the conduit;
        v) a first sealing member in direct sealing engagement with both a sealing surface of the driver member and a sealing surface of the sidewall portion to inhibit fluid from leaking into the interior housing area;
        vi) a pivot bearing at least partially disposed in the interior housing area, wherein the pivot bearing is in communication with the float such that movement of the float causes rotation of the pivot bearing; and
        vii) a shaft, wherein a first portion of the shaft is positioned within an aperture in the driver member, a second portion of the shaft is positioned within an aperture in the linkage device and a third portion of the shaft is positioned within an aperture of the pivot bearing; and
    wherein the aperture of the driver member and the cam member are each provided with a fluid tight closed end that cooperate together to trap the shaft with respect to the conduit.

2. The drop tube segment of claim 1, wherein one of the fluid tight closed ends comprises an integrally closed end.

3. The drop tube segment of claim 1, wherein at least one of the fluid tight closed ends comprises a closure member.

4. A drop tube segment adapted for use with a liquid reservoir, the drop tube segment comprising:
    a) a conduit including an end portion and a sidewall including a sidewall portion at least partially defining an interior housing area;
    b) a valve assembly including:
        i) a valve member attached to the end portion of the conduit,
        ii) a float,
        iii) a linkage device pivotally connected to the valve member and adapted for communication with the float,
        iv) a driver member at least partially disposed in the interior housing area and adapted to selectively engage the linkage device, the driver member in communication with the float such that movement of the float causes rotation of the driver member, wherein an adjustment of the float in response to a liquid level in a liquid reservoir may rotate the driver member to engage the linkage device to facilitate in adjusting the position of the valve member with respect to the end portion of the conduit;
        v) a first sealing member in direct sealing engagement with both a sealing surface of the driver member and a sealing surface of the sidewall portion to inhibit fluid from leaking into the interior housing area; and
        vi) a retainer, wherein the retainer and a portion of the driver member trap the first sealing member with respect to the sidewall portion.

5. A drop tube segment adapted for use with a liquid reservoir, the drop tube segment comprising:
    a) a conduit including an end portion and a sidewall including a sidewall portion at least partially defining an interior housing area;
    b) a valve assembly including:
        i) a valve member attached to the end portion of the conduit,
        ii) a float,
        iii) a linkage device pivotally connected to the valve member and adapted for communication with the float,
        iv) a driver member at least partially disposed in the interior housing area and adapted to selectively engage the linkage device, the driver member in communication with the float such that movement of the float causes rotation of the driver member, wherein an adjustment of the float in response to a liquid level in a liquid reservoir may rotate the driver member to engage the linkage device to facilitate in adjusting the position of the valve member with respect to the end portion of the conduit; and
        v) a first sealing member in direct sealing engagement with both a sealing surface of the driver member and a sealing surface of the sidewall portion to inhibit fluid from leaking into the interior housing area;
    wherein the driver member comprises a first portion and a second portion, and wherein the first portion engages the second portion to provide communication between the second portion and the float such that movement of the float causes rotation of the first portion together with the second portion.

6. The drop tube segment of claim 5, wherein the first portion has a keyed engagement with the second portion.

7. The drop tube segment of claim 5, further comprising a pivot bearing at least partially disposed in the interior housing area, wherein the pivot bearing is in communication with the float such that movement of the float causes rotation of the pivot bearing.

8. The drop tube segment of claims 7, wherein the first portion of the driver member engages the pivot bearing to provide communication between the pivot bearing and the float such that movement of the float causes rotation of the first portion of the driver member together with the pivot bearing.

9. The drop tube segment of claim 8, wherein the first portion of the driver member has a keyed engagement with the pivot bearing.

10. A drop tube segment adapted for use with a liquid reservoir, the drop tube segment comprising:
   a) conduit including an end portion and a sidewall including a sidewall portion at least partially defining an interior housing area;
   b) a valve assembly including:
      i) a valve member attached to the end portion of the conduit;
      ii) a float;
      iii) a linkage device pivotally connected to the valve member and adapted for communication with the float;
      iv) a driver member at least partially disposed in the interior housing area and adapted to selectively engage the linkage device, the driver member in communication with the float such that movement of the float causes rotation of the driver member, wherein an adjustment of the float in response to a liquid level in a liquid reservoir may rotate the driver member to engage the linkage device to facilitate in adjusting the position of the valve member with respect to the end portion of the conduit;
      v) a pivot bearing at least partially disposed in the interior housing area, wherein the pivot bearing is in communication with the float such that movement of the float causes rotation of the pivot bearing;
      vi) a shaft including a first portion that is positioned within an aperture in the driver member, a second portion that is positioned within an aperture in the linkage device and a third portion that is positioned within an aperture of the pivot bearing; and
      vii) wherein the aperture of the driver member and the aperture of the pivot bearing are each provided with a fluid tight closed end that cooperate together to trap the shaft with respect to the conduit; and
   wherein at least one of the fluid tight closed ends comprises a closure member.

11. The drop tube segment of claim 10, wherein the closure member is attached with respect to the corresponding aperture to form a press-fit closure.

* * * * *

UNITED STATES PATENT AND TRADEMARK OFFICE
CERTIFICATE OF CORRECTION

PATENT NO. : 7,243,675 B2  Page 1 of 1
APPLICATION NO. : 10/837206
DATED : July 17, 2007
INVENTOR(S) : Kristopher A. Kane et al.

It is certified that error appears in the above-identified patent and that said Letters Patent is hereby corrected as shown below:

Claim 1, column 13, line 30, change "conduit" to --a conduit--.

Claim 10, column 15, line 17, change "conduit" to --a conduit--.

Signed and Sealed this

Sixteenth Day of October, 2007

JON W. DUDAS
*Director of the United States Patent and Trademark Office*